(No Model.)

L. HARRIS.
CAR WHEEL AND AXLE.

No. 505,983. Patented Oct. 3, 1893.

WITNESSES:
Clara A. Williams.
Newton G. Leslie.

INVENTOR
Levi Harris
BY Lucius C. West
ATTORNEY.

UNITED STATES PATENT OFFICE.

LEVI HARRIS, OF KALAMAZOO, MICHIGAN, ASSIGNOR OF TWO-THIRDS TO OSCAR M. ALLEN, SR., AND HORACE B. PECK, OF SAME PLACE.

CAR WHEEL AND AXLE.

SPECIFICATION forming part of Letters Patent No. 505,983, dated October 2, 1893.

Application filed January 6, 1893. Serial No. 457,444. (No model.)

*To all whom it may concern:*

Be it known that I, LEVI HARRIS, a citizen of the United States, residing at Kalamazoo, county of Kalamazoo, State of Michigan, have invented a new and useful Car Wheel and Axle, of which the following is a specification.

The object of this invention is to make it possible in a practical manner to employ both a loose and a rigid wheel on the revoluble axles of cars, which axles have bearings at the ends outside of the wheels, and support the burden of the cars, and to accomplish this by a construction which will obviate the use of packing, and prevent end-shucking, twisting and lateral canting of the loose wheel.

Figure 4:
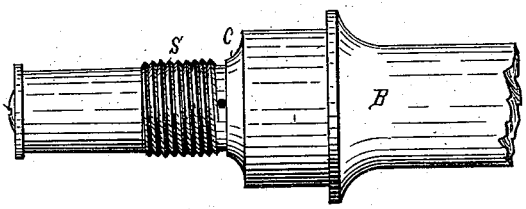
Figure 1:
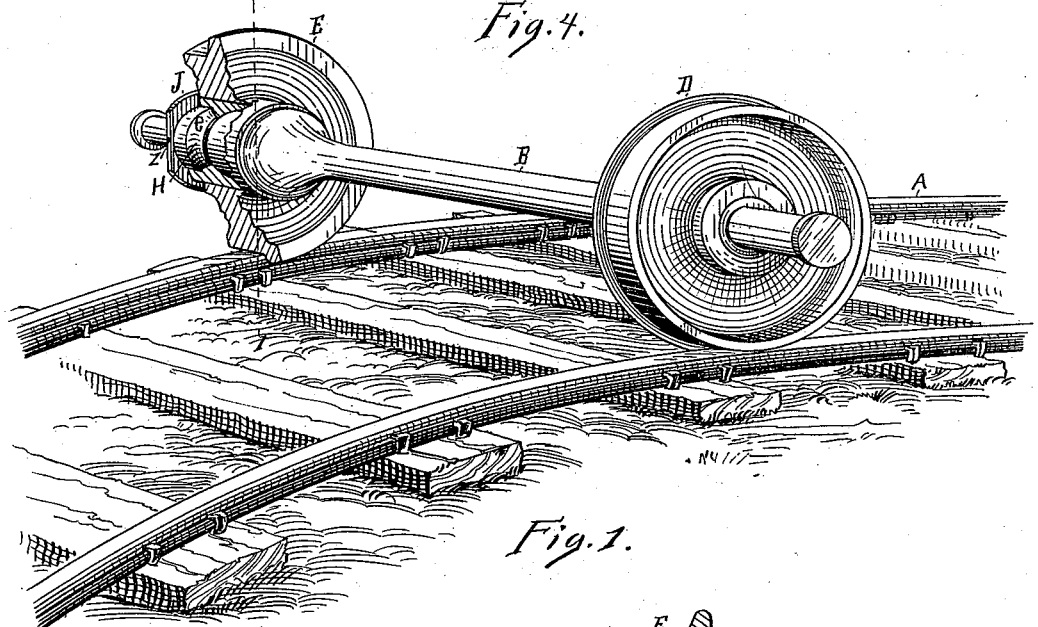
Figure 2:
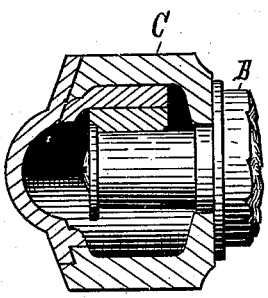
Figure 3:
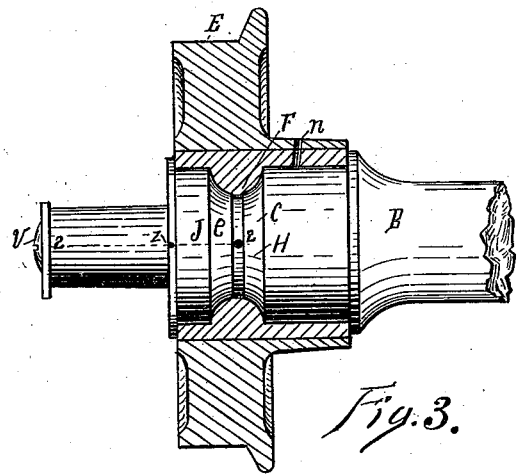

In the drawings forming a part of this specification, Figure 1 is a perspective view of a curved, broken portion of a railroad track, showing the wheels and axle, with a portion of the loose wheel broken away. Fig. 2 is a sectional elevation of an axle-box; Fig. 3 an enlarged sectional view on line 1—1, in Fig. 1; and Fig. 4 is an enlarged elevation of the end of the axle which carries the loose wheel.

Of course it is well understood that, as cars are now constructed, with revoluble axles having a rigid wheel on each rail of the track, the wheel on the outer rail, in going around a curve, must travel much farther than the wheel on the inner rail, causing the wheels to slip on the track, thus cramping and creating friction and increasing the liability of derailment.

The construction described in detail below is designed to obviate these difficulties by having one of the wheels revoluble on the axle in a manner which my invention makes possible and desirable to employ.

Referring to the lettered parts of the drawings, A represents the curve of a railroad track, and B the revoluble axle of a car, of the ordinary construction in general, which has bearings at the ends outside of the wheels, in the axle-boxes of the cars, as at C, Fig. 2, which of course in use are employed in connection with the axle-guard and its superincumbent weight.

Fig. 2 is introduced as important to illustrate more clearly just what style of axle my invention especially pertains to, viz., an axle which revolves with the wheels and bears the burden on the ends outside of the wheels. This axle, B, has a rigid wheel, D, at one end, and a loose wheel, E, at the other end; that is, the wheel D and the axle B are rigidly attached to each other, while the wheel E turns on the axle B when rounding a curve, and revolves with the axle when on a straight track, or the axle B, with its rigid wheel, revolves on its bearings in the loose wheel when rounding a curve, as explained in the operation.

Referring to Fig. 1, it will be seen that the loose wheel is on the outer rail, having the longest curve; hence said loose wheel has to travel much farther than the rigid wheel on the inner rail having the shorter curve, in rounding said curve, and since the wheel E has revoluble bearings on the axle B, it will revolve enough faster than the axle and rigid wheel to make up for the difference in distance, and immediately the straight track is reached it will revolve with the axle, at the same speed; in other words, it will revolve with the axle except in going around curves. When the track is curved in the opposite direction, bringing the wheel D on the outer rail, having the longest curve, said wheel and the axle will revolve on their bearings in the loose wheel, E, enough faster than the wheel E revolves to make up for the difference in distance, the same as did the wheel E when said wheel was on the longest curve. It will thus be seen that both wheels have the function of loose wheels, according to the demands caused by the different directions of the curvatures of the track.

In order to prevent the loose wheel from pounding against the shoulders of the axle, by shucking endwise, and to prevent twisting and canting I have provided said loose wheel E with an internal circular rib, F, which loosely fits into a peripheral groove H, in the axle. The gravity of the burden which the wheels support will cause the under side of the groove in the axle to always fit snugly that portion of the rib in the wheel-hub which fits into said under portion of the groove, it matters not how much the bearings become worn, and hence it is impossible for the wheel to ever shuck endwise to cant and twist or to bring any material strain on the shoulder of the axle or the flange of the nut. It will be observed that one half of this peripheral groove, H, is formed in the axle itself, as at c, Figs. 3 and 4, and the other half in the nut, J, which holds the wheel on, as at e, so that when said nut is passed into the hub of the wheel from the outside and screwed on to the threaded portion, s, Fig. 4, of the axle B, the groove will be complete, as in Fig. 3, said figure showing the nut screwed entirely up, to hold the wheel on. If it is found necessary, this nut may be fastened on the axle by inserting a pin in the hole, z, in the head of the nut, Figs. 1 and 3.

The oil hole is indicated by a dotted line, 2—2, in Fig. 3, extending from the outer end of the axle to the center of the groove H, and thence extending outward into a circular channel at the base of the peripheral groove H, the outer end of said hole being stopped with a plug or screw, v; or the loose wheel may be lubricated by means of an oil hole shown at n, Fig. 3. However, this loose wheel will need but very little, if any, lubricant, since it turns on the axle only when rounding a curve, and since its inner periphery comes in direct contact with the periphery of an axle which bears the burden of the cars, and which axle and wheel revolve together for the most part as though rigidly connected.

Having thus described my invention, what I claim as new, and desire to secure by Letters Patent of the United States, is—

In a car, a revoluble axle bearing a rigid and a loose wheel, the ends of said axle outside of the wheels having revoluble bearings in boxes which are attached to the car and support the burden thereof, said loose wheel being provided with an internal circular rib, and that portion of the axle which has direct bearings in said loose wheel having a portion of a peripheral groove formed therein, and a nut forming a part of the bearing portion of the axle and having the other portion of the peripheral groove formed therein; substantially as set forth.

In testimony to the foregoing I have hereunto subscribed my name in the presence of two witnesses.

LEVI HARRIS.

Witnesses:
  NEWTON G. LESLIE,
  LUCIUS C. WEST.